United States Patent
Beers et al.

(10) Patent No.: US 10,451,733 B2
(45) Date of Patent: Oct. 22, 2019

(54) TWO-DIMENSIONAL ULTRASOUND IMAGING TRANSDUCER ARRAY WITH A NON-RECTANGULAR ACTIVE SENSING REGION

(71) Applicant: Sound Technology Inc., State College, PA (US)

(72) Inventors: Christopher J Beers, Boalsburg, PA (US); Joseph S. Conklin, Pleasant Gap, PA (US); Dean A. McHenry, State College, PA (US); Russell W. Woods, Lewistown, PA (US); Henrik Jensen, Bagsvaerd (DK)

(73) Assignee: Sound Technology Inc., State College, PA (US)

( * ) Notice: Subject to any disclaimer, the term of this patent is extended or adjusted under 35 U.S.C. 154(b) by 284 days.

(21) Appl. No.: 15/510,301

(22) PCT Filed: Sep. 12, 2014

(86) PCT No.: PCT/US2014/055411
§ 371 (c)(1),
(2) Date: Mar. 10, 2017

(87) PCT Pub. No.: WO2016/039772
PCT Pub. Date: Mar. 17, 2016

(65) Prior Publication Data
US 2017/0299719 A1    Oct. 19, 2017

(51) Int. Cl.
*G01S 15/89* (2006.01)
*G01S 7/52* (2006.01)
(52) U.S. Cl.
CPC ...... *G01S 15/8925* (2013.01); *G01S 7/52085* (2013.01)

(58) Field of Classification Search
CPC ................. G01S 15/8925; G01S 7/52085
See application file for complete search history.

(56) References Cited

U.S. PATENT DOCUMENTS

| 5,797,845 A | 8/1998 | Barabash et al. |
| 5,860,926 A | 1/1999 | Barabash et al. |

(Continued)

FOREIGN PATENT DOCUMENTS

| CN | 106796290 A | * 5/2017 | ......... G01S 15/8925 |
| EP | 1533626 | 5/2008 | |

(Continued)

OTHER PUBLICATIONS

International Search Report for PCT/IB2014/055411 published as WO2016/039772 A1 dated Mar. 17, 2016.

*Primary Examiner* — Daniel Pihulic
(74) *Attorney, Agent, or Firm* — Anthony M. Del Zoppo, III; Daugherty & Del Zoppo Co., LPA (57) ABSTRACT

An ultrasound imaging system (102) includes a transducer array (108) with a two-dimensional array of rows (110) of transducer elements (114). The transducer elements of each row extend along a long axis (116). The rows are parallel to each other. The transducer array includes a non-rectangular set of active transducer elements. The ultrasound imaging system further includes transmit circuitry (118) that actuates the transducer elements to transmit an ultrasound signal. The ultrasound imaging system further includes receive circuitry (120) that receives echoes produced in response to an interaction between the ultrasound signal and a structure and received by the transducer elements. The ultrasound imaging system further includes a beamformer that processes the echoes and generates one or more scan lines indicative of the structure.

15 Claims, 8 Drawing Sheets (56) References Cited

U.S. PATENT DOCUMENTS

| | | | |
|---|---|---|---|
| 6,381,197 B1* | 4/2002 | Savord | B06B 1/0292 |
| | | | 367/178 |
| 6,783,497 B2* | 8/2004 | Grenon | A61B 8/12 |
| | | | 310/320 |
| 2003/0220554 A1* | 11/2003 | Grenon | A61B 8/12 |
| | | | 600/407 |
| 2008/0188755 A1* | 8/2008 | Hart | A61B 8/00 |
| | | | 600/459 |
| 2009/0108710 A1 | 4/2009 | Brown et al. | |
| 2017/0299719 A1* | 10/2017 | Beers | G01S 7/52085 |

FOREIGN PATENT DOCUMENTS

| | | | | |
|---|---|---|---|---|
| EP | 3191868 A1 * | 7/2017 | | G01S 15/8925 |
| WO | 2014045073 A1 | 3/2014 | | |
| WO | WO-2014045073 A1 * | 3/2014 | | G01S 7/52049 |
| WO | WO-2016039772 A1 * | 3/2016 | | G01S 15/8925 |

* cited by examiner

FIGURE 24

TWO-DIMENSIONAL ULTRASOUND IMAGING TRANSDUCER ARRAY WITH A NON-RECTANGULAR ACTIVE SENSING REGION

RELATED APPLICATION

This application is a national filing of PCT application Serial No. PCT/US2014/055411, filed Sep. 12, 2014, published as WO2016/039772 on Mar. 17, 2016. This application claims priority to PCT application Serial No. PCT/US2014/055411, published as WO2016/039772 on Mar. 17, 2016.

TECHNICAL FIELD

The following generally relates to ultrasound imaging and more particularly to a two-dimensional ultrasound imaging transducer array with a non-rectangular active sensing region.

BACKGROUND

Ultrasound imaging has provided useful information about the interior characteristics (e.g., organ tissue, material flow, etc.) of a subject under examination. An ultrasound imaging systems had included a probe with a transducer array and a console. The transducer array has included one or two dimensional arrays of transducer elements. The console has included circuitry to control the transducer elements to transmit an ultrasonic beam and receive echoes produced in response thereto. The console has also included componentry to process the received echoes and generate an image(s) of the interior characteristics.

A one-dimensional array has a single row of transducer elements that extends in the azimuth direction. With a multi-row array, several parallel one-dimensional arrays extending in the azimuth direction are aligned along the elevation direction. Ultrasound imaging can leverage multiple rows of transducer arrays to improve image quality. For example, by operating the rows independently, the depth of the elevation focus can be electrically adjusted, enabling better slice thickness control through a longer depth of the image. This control is particularly well-suited for improving image quality uniformity when imaging at greater depths through a large depth-of-field.

Where each row of a transducer array has the same number of elements, the number of elements and independent channels is proportional to the number of rows. Unfortunately, increasing the number of elements increases the array footprint and the number of channels, which increase the size and cost of the array and/or the cable. A larger cable may cause more stress on the sonographer's hand while maneuvering the probe. A larger array footprint may make it more difficult for the sonographer to make uniform contact between the entire array surface and the subject. Furthermore, a larger array footprint may place new heat dissipation requirements on the probe.

SUMMARY

Aspects of the application address the above matters, and others.

In one aspect, an ultrasound imaging system includes a transducer array with a two-dimensional array of rows of transducer elements. The transducer elements of each row extend along a long axis. The rows are parallel to each other. The transducer array includes a non-rectangular set of active transducer elements. The ultrasound imaging system further includes transmit circuitry that actuates the transducer elements to transmit an ultrasound signal. The ultrasound imaging system further includes receive circuitry that receives echoes produced in response to an interaction between the ultrasound signal and a structure and received by the transducer elements. The ultrasound imaging system further includes a beamformer that processes the echoes and generates one or more scan lines indicative of the structure.

In another aspect, a method includes receiving a signal indicating an imaging mode of interest, wherein the imaging mode indicates one of a first mode, which has a first focus depth, or a second mode, which has a second focus depth, wherein the second focus depth is greater than the first focus depth. The method further includes selectively exciting, with electronic circuitry, a set of rows of transducer elements of a non-rectangular two-dimensional array of active transducer elements based on the signal.

In another aspect, an imaging apparatus includes a transducer array including a two-dimensional array of rows of transducer elements. The two-dimensional array includes a thermal dissipater in a sub-region of outer rows of the two-dimensional array of rows. The transducer array further includes transmit circuitry that actuates the transducer elements to transmit an ultrasound signal. The transducer array further includes receive circuitry that receives echoes produced in response to an interaction with the ultrasound signal. The transducer array further includes a beamformer that processes the echoes and generates one or more scan lines indicative of the structure.

Those skilled in the art will recognize still other aspects of the present application upon reading and understanding the attached description.

BRIEF DESCRIPTION OF THE DRAWINGS

The application is illustrated by way of example and not limitation in the figures of the accompanying drawings, in which like references indicate similar elements and in which.

DETAILED DESCRIPTION

Figure 1:
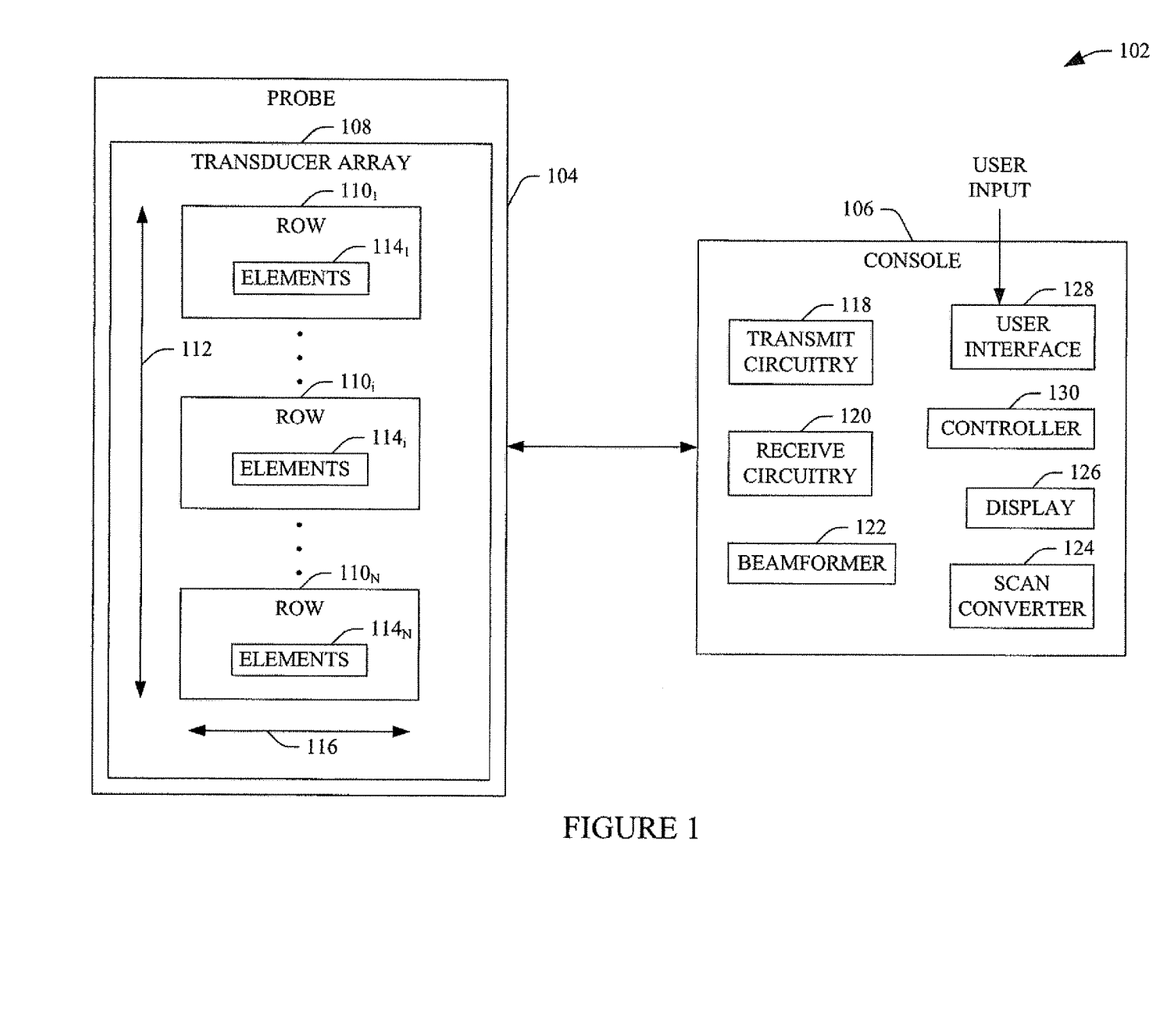
FIG. 1 schematically illustrates an example ultrasound imaging system with a probe with a two-dimensional transducer array of elements.

FIG. 1 schematically illustrates an example imaging system 102, such as ultrasonic (US) imaging system. The imaging system 102 includes an ultrasound transducer probe 104 and a console 106. The ultrasound transducer probe 104 interfaces with the console 106 through a suitable interface. For example, the ultrasound transducer probe 104 and the console 106 can be interfaced through a cable connector of a cable of the probe 104 and a complementary interface of the console 106, complementary wireless communication interfaces, etc.

The ultrasound transducer probe 104 includes a two-dimensional (2D) transducer array 108 with a plurality of one-dimensional (1D) rows $110_1, 110_i, \ldots 110_N$ (where i and N are positive integers) arranged parallel to each other in the elevation direction 112, each with a respective set of elements $114_1, \ldots 114_i, \ldots 114_N$ extending along the azimuth direction 116. A row 110 may include 16, 32, 64, 192, 256, and/or other number of transducer elements 114. The elements 114 are configured to transmit ultrasound signals and receive echo signals.

As described in greater detail below, the number of active elements in the transducer array 108 has a non-rectangular shape in that the elements 114 of a center row 110, includes more active elements than the outer rows $110_1$ and $110_N$. In one instance, this transducer array 108 includes a non-rectangular shape of elements. In another instance, this transducer array 108 includes a rectangular shape with a non-rectangular shape of active elements. The configuration with the non-rectangular shape of elements may improve ergonomics by allowing for a reduced size probe 104 and/or cable, making it easier for the sonographer to maneuver the probe 104 and make uniform contact between the transducer array 108 and the subject. This configuration may also facilitate heat dissipation away from the subject. Both configurations may reduce cost relative to a configuration with a fully populated rectangle of active elements.

The console 106 includes transmit circuitry 118 that is configured to selectively excite one or more of the transducer elements 114 and/or rows 110. For example, in one instance, the transmit circuitry 118 generates a set of pulses that are conveyed to the transducer array 108, causing certain elements 114 of certain rows 110 thereof to transmit an ultrasound signal. The individual rows 110 are configured to be selectively controllable and can be excited to create ultrasound beams for at least two different depths, including a shallow depth (e.g., using less rows in elevation) and deep depth (e.g., using more rows in elevation).

The console 106 further includes receive circuitry 120 that is configured to receives a set of echoes (or echo signals) generated in response to the transmitted ultrasound signals. The echoes, generally, are a result of the interaction between the emitted ultrasound signals and structure. The receive circuit 120 may be configured for spatial compounding, filtering (e.g., FIR and/or IIR), and/or other echo processing. The console 106 further includes a beamformer 122 configured to process the received echoes, e.g., in B-mode, by applying time delays and weights to the echoes and summing the delayed echoes.

The console 106 further includes a scan converter 124 configured to convert the data for display, e.g., by converting the beamformed data to the coordinate system of a display or display region used to visually present the resulting data. The illustrated console 106 further includes a display 126 used to display the scan converted data. The console 106 further includes a user interface (UI) 128 that include one or more input devices (e.g., a button, a knob, a slider, etc.) and/or one or more output devices (e.g., a display, etc.), which allows for interaction between with the system 102.

The console 106 further includes a controller 130 configured to control the various components of the imaging system 102. For example, such control may include selectively exciting individual (or groups) of rows 110 to control, electrically, a depth of the elevation focus for shallow depth imaging mode and for deeper depth imaging mode. Generally, for deeper depths, more rows 110 in elevation are excited. Such control by the controller 130 can be in conjunction with A-mode, B-mode, C-plane, and/or other data acquisition mode.

The console 106 may include one or more processors (e.g., a microprocessor, a central processing unit, etc.) that execute one or more computer readable instructions encoded or embedded on computer readable storage medium (which excludes transitory medium) such as physical memory and other non-transitory medium to perform one or more of functions described herein and/or other functions in connection with ultrasound imaging. The one or more processors can also execute an instruction(s) carried in a signal, carrier wave and other transitory medium to perform such actions.

Figure 2:
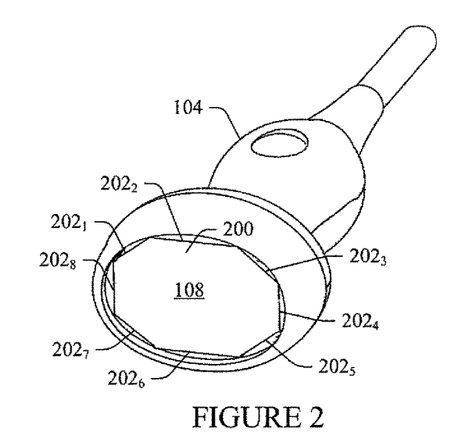
FIG. 2 illustrates an example of the probe with a first two-dimensional transducer array configuration.
Figure 3:
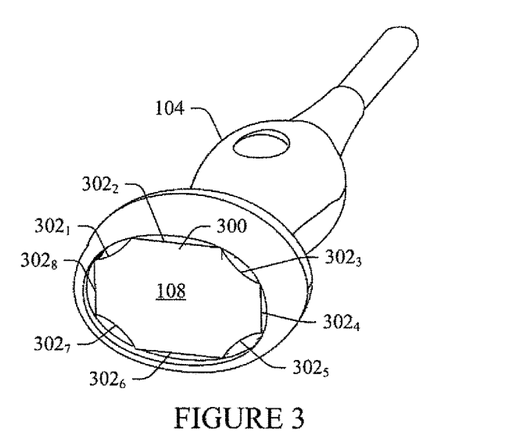
FIG. 3 illustrates an example of the probe with a second two-dimensional transducer array configuration.
Figure 4:
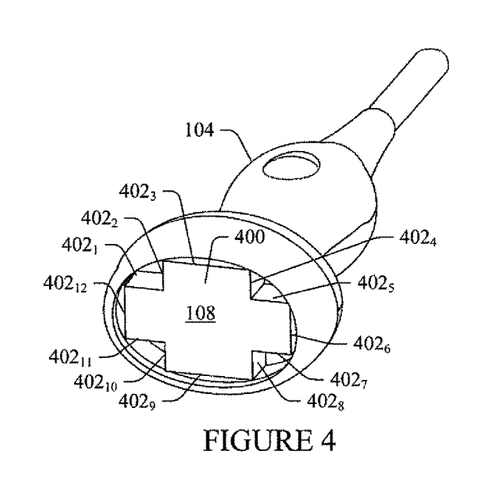
FIG. 4 illustrates an example of the probe with a third two-dimensional transducer array configuration.
Figure 5:
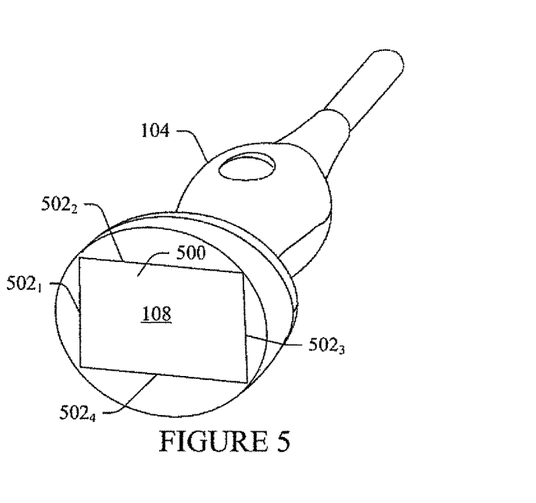
FIG. 5 illustrates an example of the probe with a fourth two-dimensional transducer array configuration.

FIG. 2 shows an embodiment of the probe 104 in which the transducer array 108 includes an octagonal shaped transducing plane 200 with eight linear sides $202_1, \ldots, 202_8$. FIG. 3 shows an embodiment of the probe 104 in which the transducer array 108 includes a transducing plane 300 with four linear sides $302_2, 302_4, 302_6, 302_8$, and four curved sides $302_1$, $302_3$, $302_5$, $302_7$. FIG. 4 shows an embodiment of the probe 104 in which the transducer array 108 includes a cross-shaped transducing plane 400 with twelve linear sides $402_1$, . . . , $402_{12}$. FIG. 5 shows an embodiment of the probe 104 in which the transducer array 108 includes a rectangular shaped plane 500 with four linear sides $502_1$, . . . , $502_4$.

Figure 6:
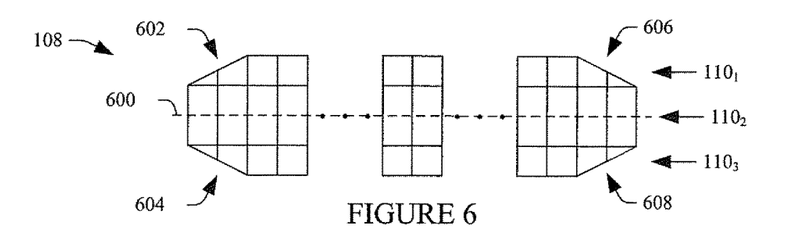
FIG. 6 schematically illustrates a first example of an element configuration for the two-dimensional transducer array configuration of FIG. 2.

FIG. 6 shows an embodiment of the transducer array 108 of FIG. 2. In this embodiment, the transducer array 108 includes three rows of transducer elements including a first outer row $110_1$, an inner $110_2$, and a second outer row $110_3$. The inner row $110_2$ has a first number of rectangular transducer elements. The first and second outer rows $110_1$ and $110_3$ have the same number of transducer elements as the inner row $110_2$, except that elements in end regions 602, 604, 606 and 608 are not full rectangular elements. The remaining elements are full rectangular elements like the elements in the inner row $110_2$.

The individual rows $110_1$, $110_2$ and $110_3$, in one instance, are formed through dicing or cutting lines parallel to a longitudinal axis 600 of the transducer array 108, e.g., using a saw, a wire, etc. The not full rectangular elements in the end regions 602, 604, 606 and 608 are also cut diagonally, with respect to the longitudinal axis 600, e.g., similarly cut using a saw, a wire, etc. In the illustrated embodiment, each of the end regions 602, 604, 606 and 608 includes two partial elements. In another embodiment, there can be more or less than two partial elements in the end regions 602, 604, 606 and 608, and the number of partial elements may differ between the end regions 602, 604, 606 and 608.

With this embodiment, electrical connections are made to all of the elements 114 except the elements in the end regions 602, 604, 606 and 608. The electrical connections can be made through physical connections through the interconnect layer and are used to excite the corresponding elements 114. The number of channels, relative to a configuration in which electrical connections are made to all of the elements 114, is reduced, which, in turn, allows for a smaller cable which requires less torque to maneuver, making it easier on the sonographer, and reduces overall cost. This configuration also has a reduced footprint relative to a configuration with a full rectangular array footprint, allowing for more uniform physical contact with a patient and smaller probes.

Figure 7:
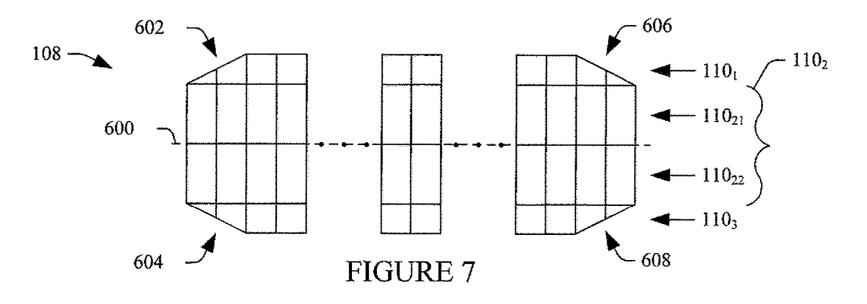
FIG. 7 schematically illustrates a second example of the element configuration for the two-dimensional transducer array configuration of FIG. 2.
Figure 8:
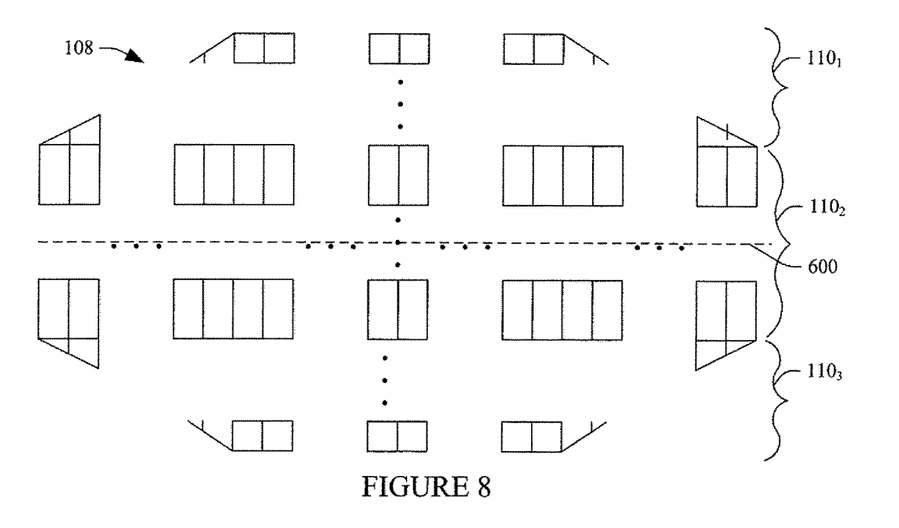
FIG. 8 schematically illustrates a third example of the element configuration for the two-dimensional transducer array configuration of FIG. 2.

FIG. 7 shows a variation of FIG. 6 in which the inner row $110_2$ includes a first inner row $110_{21}$ and a second inner row $110_{22}$, which are symmetric about the longitudinal axis 600. FIG. 8 shows a variation of FIG. 6 in which one or both of the rows $110_1$ and/or $110_3$ can include one or more rows 110, including an even number or an odd number of rows, and the inner row $110_2$ can include two or more rows 110, including an even number or an odd number of rows.

Figure 9:
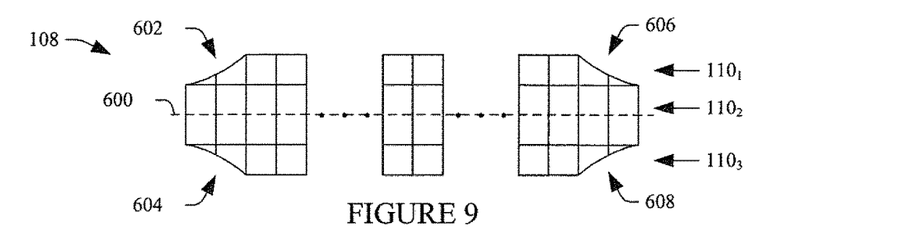
FIG. 9 schematically illustrates a first example of an element configuration for the two-dimensional transducer array configuration of FIG. 3.
Figure 10:
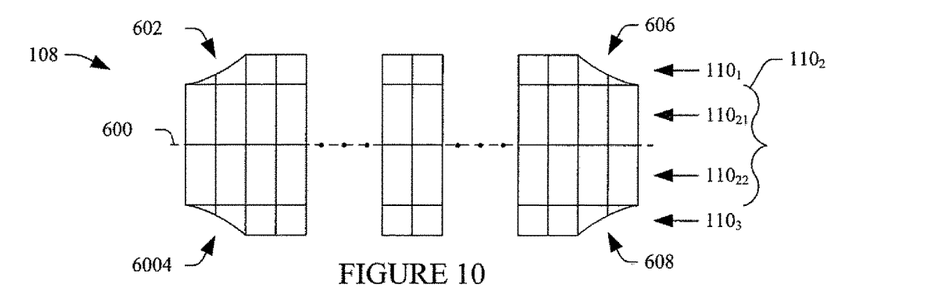
FIG. 10 schematically illustrates a second example of the element configuration for the two-dimensional transducer array configuration of FIG. 3.
Figure 11:
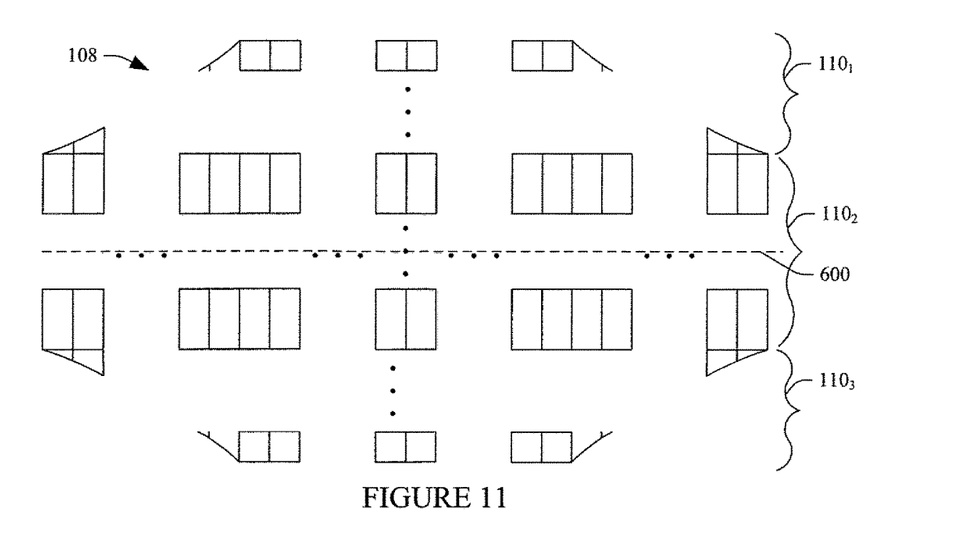
FIG. 11 schematically illustrates a third example of the element configuration for the two-dimensional transducer array configuration of FIG. 3.

FIGS. 9, 10 and 11 show embodiments of the transducer array 108 of FIG. 3. FIGS. 9, 10 and 11 are substantially similar to that of FIGS. 6, 7 and 8, except that the end regions 602, 604, 606 and 608 have a curved diagonal side. In this example, the curved diagonal side is convex. In a variation, the curved diagonal side can be concave. In another variation, the curved diagonal side can be irregular and/or otherwise shaped.

Figure 12:
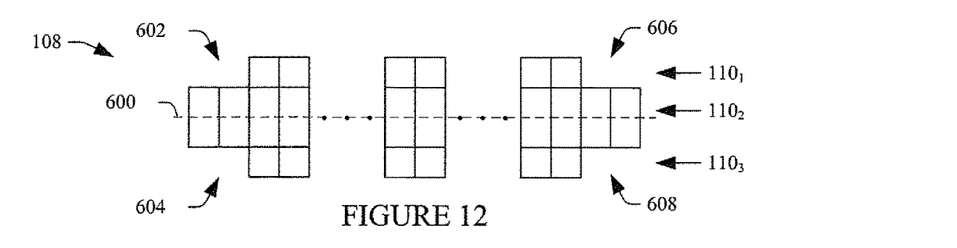
FIG. 12 schematically illustrates a first example of an element configuration for the two-dimensional transducer array configuration of FIG. 4.
Figure 13:
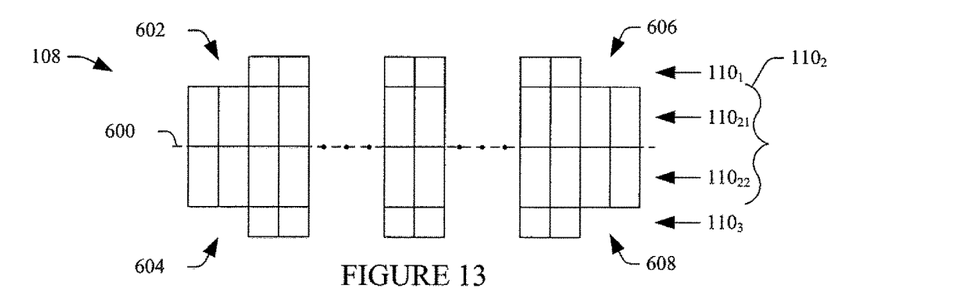
FIG. 13 schematically illustrates a second example of the element configuration for the two-dimensional transducer array configuration of FIG. 4.
Figure 14:
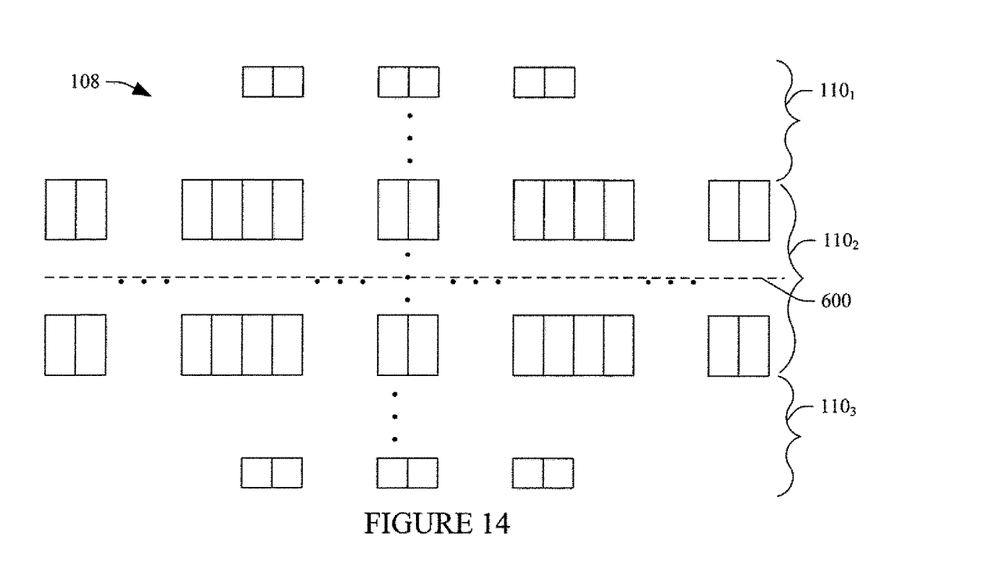
FIG. 14 schematically illustrates a third example of the element configuration for the two-dimensional transducer array configuration of FIG. 4.
Figure 15:
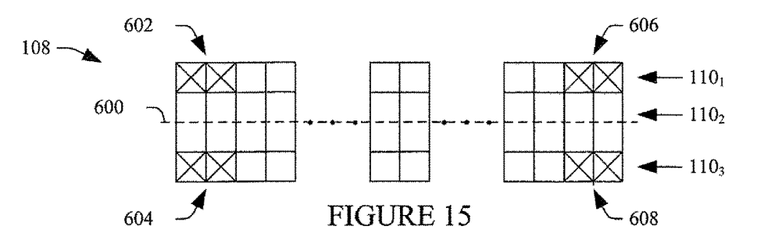
FIG. 15 schematically illustrates a first example of an element configuration for the two-dimensional transducer array configuration of FIG. 5.
Figure 16:
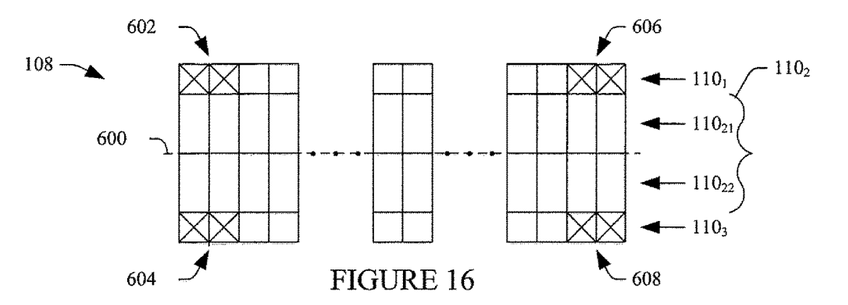
FIG. 16 schematically illustrates a second example of the element configuration for the two-dimensional transducer array configuration of FIG. 5.
Figure 17:
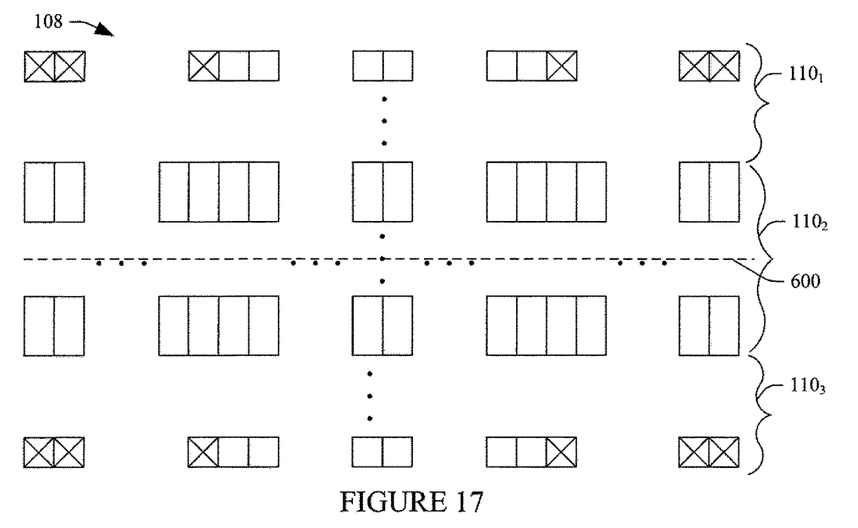
FIG. 17 schematically illustrates a third example of the element configuration for the two-dimensional transducer array configuration of FIG. 5.
Figure 18:
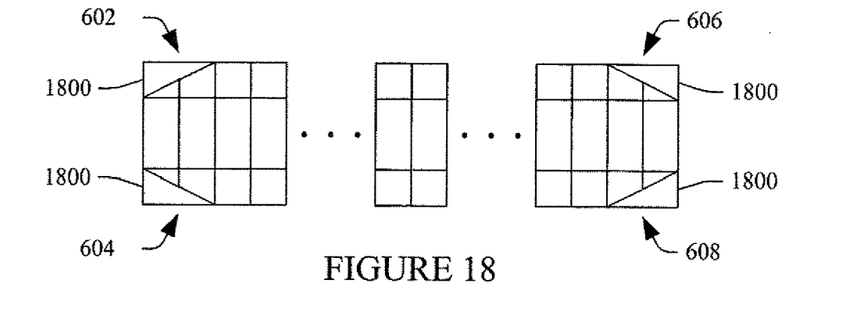
FIG. 18 schematically illustrates a variation of FIG. 6 with a heat sink at one or more of the end regions in an area with no transducer element.

FIGS. 12, 13 and 14 show embodiments of the transducer array 108 of FIG. 4. FIGS. 12, 13 and 14 are substantially similar to that of FIGS. 6, 7 and 8, except that the end regions 602, 604, 606 and 608 do not include any elements 114. FIGS. 15, 16 and 17 show embodiments of the transducer array 108 of FIG. 5. FIGS. 15, 16 and 17 include full rectangular elements in the end regions 602, 604, 606 and 608, forming a rectangular footprint. However, the elements 114 in the end regions 602, 604, 606 and 608 are not active in that there are no physical electrical connections to these elements 114.

With respect to side lobes, generally, a smoother transition from vibration to no vibration results in reduced unused energy (e.g., reduced in magnitude) with more energy in the image plane. As such the configuration of FIG. 5 will have the smallest side lobes, followed by FIG. 2, FIG. 3 and FIG. 4, which has a sharper discontinuity at the end active elements of the outer rows.

With respect to heat dissipation away from the subject, the shorter the lateral distance from the center to the perimeter allows for bringing the thermal conductive element (e.g., a copper foil) back from the surface sooner, which reduces the heat at the transducer array 108 subject interface. As such the configuration of FIG. 4 will have the greatest heat dissipation, followed by FIG. 3, FIG. 2 and FIG. 1, which requires the copper foil to extend out the farthest in the lateral direction before it is folded back over the elements.

Figure 19:
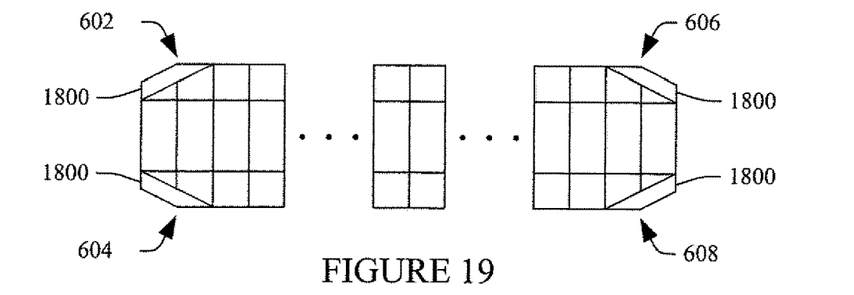
FIG. 19 schematically illustrates another variation of FIG. 6 with a heat sink at one or more of the end regions in an area with no transducer element.
Figure 20:
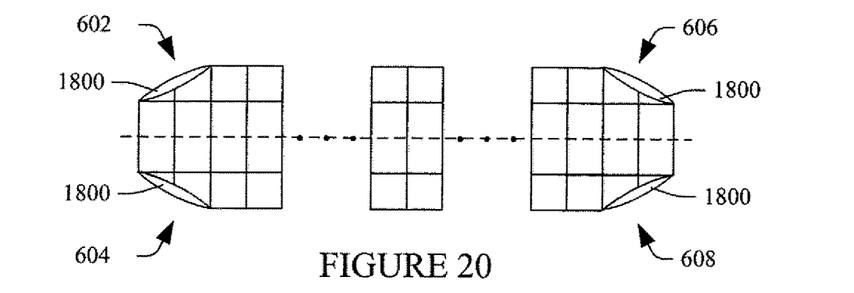
FIG. 20 schematically illustrates a variation of FIG. 9 with a heat sink at one or more of the end regions in an area with no transducer element.
Figure 21:
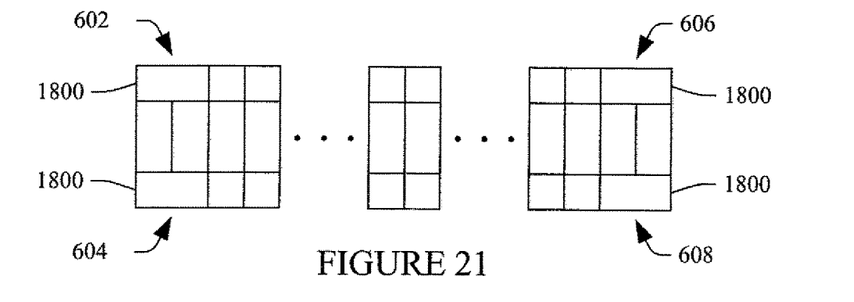
FIG. 21 schematically illustrates a variation of FIG. 12 with a heat sink at one or more of the end regions in an area with no transducer element.

With further respect to heat dissipation, FIGS. 18, 19, 20 and 21 show variations of FIGS. 6, 9 and 12 in which a heat sink 1800 is included in one or more of the end regions 602, 604, 606 or 608 in an area with no transducer element. As shown, the heat sink 1800 can be variously shaped and occupy the full available region to form a full rectangular array (FIGS. 18 and 21) or a sub-region of the available region, maintaining a non-rectangular (FIGS. 19 and 20). In general, the heat sink 1800 conducts heat in the elevation direction away from a center of the transducer array 108. The heat sink 1800 may include a thermal electric cooler, a heat pipe, a fluid, and/or other heat sink.

Figure 23:
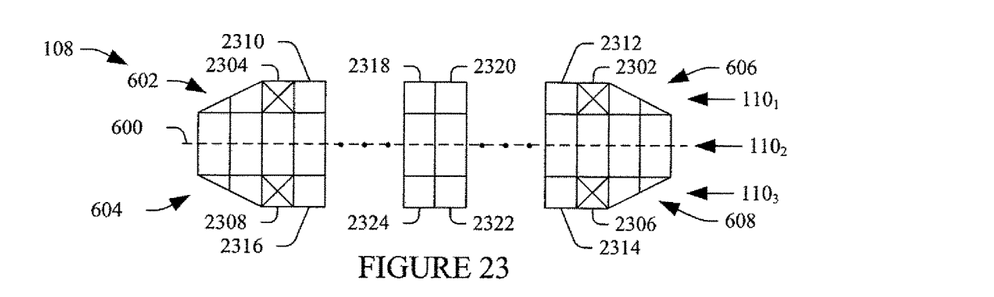
FIG. 23 schematically illustrates a variation of FIG. 6.

FIG. 23 shows a variation of FIG. 6. In this variation, not all of the rectangular elements 114 are electrically connected. For example, in FIG. 23, rectangular elements 2302, 2304, 2306 and 2308 are not electrically connected. With this configuration, end-most electrically-connected elements 2310, 2312, 2314 and 2316 will behave similar to middle-most electrically-connected elements 2318, 2320, 2322 and 2324.

Figure 24:
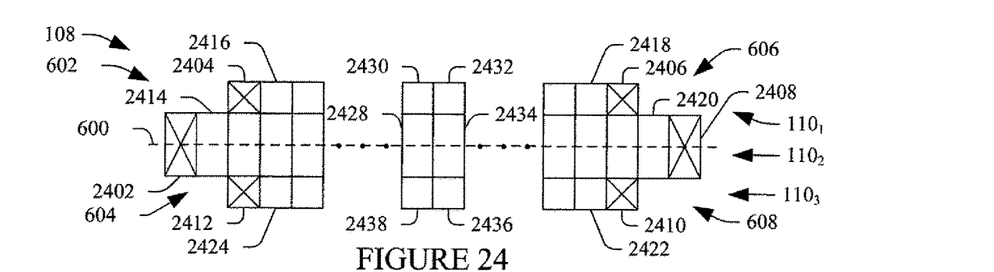
FIG. 24 schematically illustrates a variation of FIG. 12.

FIG. 24 shows a variation of FIG. 12. In this variation, rectangular elements 2402, 2404, 2406, 2408, 2410 and 2412 are not electrically connected. With this configuration, end-most electrically-connected elements 2214, 2416, 2318, 2420, 2422, and 2424 will behave similar to middle-most electrically-connected elements 2428, 2430, 2432, 2424, 2436, and 2438.

Generally, for any of the embodiments of FIGS. 2-5, if one or more physical elements are beyond the electrically-connected elements, azimuthally, a performance of the end-most electrically-connected elements will be similar to the middle-most electrically-connected elements. In contrast, if the end-most electrically-connected elements are also the end-most physical elements, the end-most elements will exhibit different behavior than the middle elements, e.g., because its lateral boundary condition is different in the azimuth direction.

Figure 22:
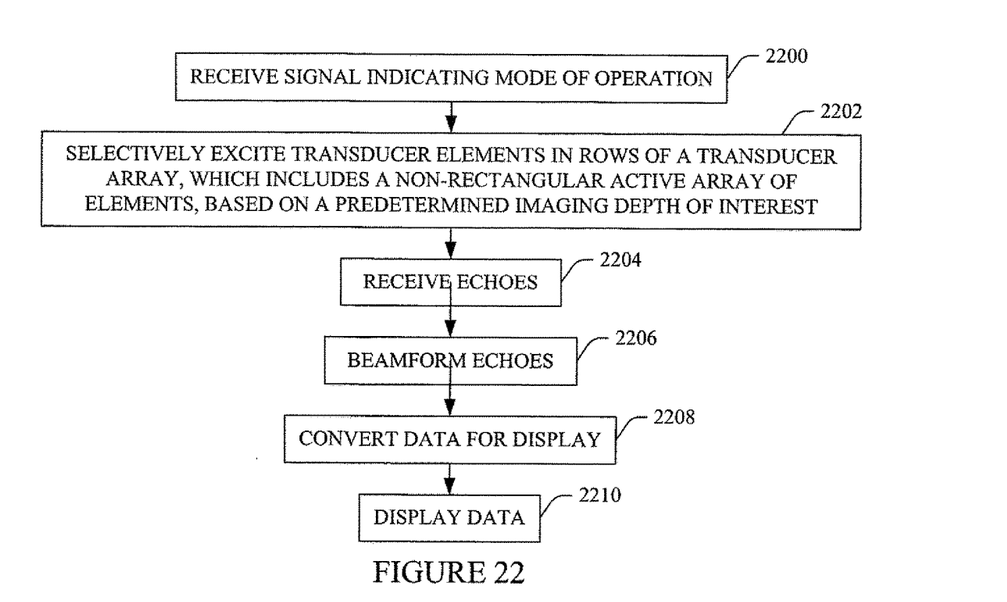
FIG. 22 schematically illustrates an example method in accordance with the embodiments described herein.

FIG. 22 illustrates a method in accordance with the embodiments discussed herein.

The ordering of the following acts is for explanatory purposes and is not limiting. As such, one or more of the acts can be performed in a different order, including, but not limited to, concurrently. Furthermore, one or more of the acts may be omitted and/or one or more other acts may be added.

At 2200, a signal indicating a mode of operation is received. In this example, the mode of operation relates to shallow depth and deep depth applications.

At 2202, transducer elements in rows of a transducer array of an ultrasound imaging probe with a non-rectangular active array of elements are selectively excited to transmit an ultrasound beam for imaging at a predetermined depth.

An example of selectively exciting different rows in elevation for different focus depths is described in international patent application PCT/IB2012/001823, entitled "ULTRASOUND IMAGING," and filed on Sep. 18, 2012, the entirety of which is incorporated herein by reference.

At 2204, echoes generated in response thereto are received by the transducer elements.

At 2206, the echoes are beamformed.

At 2208, the beamformed echoes are scan converted for display on a monitor.

At 2210, the ultrasound imaging data is displayed.

The above may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. An ultrasound imaging system, comprising:
    a transducer array including a two-dimensional array of rows of transducer elements, wherein the two-dimensional array includes outer rows with end regions and at least one inner row disposed between the outer rows, the outer rows includes partial transducer elements in the end regions, the transducer elements of each row extend along a long axis, the rows are parallel to each other, the partial transducer elements have a linear side that is diagonal to the long axis, and the transducer array includes a non-rectangular set of active transducer elements;
    transmit circuitry that actuates the transducer elements to transmit an ultrasound signal;
    receive circuitry that receives echoes produced in response to an interaction between the ultrasound signal and a structure and received by the transducer elements; and
    a beamformer that processes the echoes and generates one or more scan lines indicative of the structure.

2. The system of claim 1, wherein the two-dimensional array includes outer rows with end regions and at least one inner row disposed between the outer rows, and the outer rows include no transducer elements in the end regions.

3. The system of claim 2, wherein the at least one inner row has a first number of transducer elements and at least one outer row has a second number of transducer elements, and the first number is greater than the second number.

4. The system of claim 1, further comprising: a heat sink disposed in an area of at least one of the end regions that does not include a portion of a transducer element.

5. The system of claim 4, wherein the heat sink includes one or more of a thermal electric cooler, a heat pipe, or a fluid.

6. The system of claim 1, wherein the two-dimensional array includes outer rows with end regions and at least one inner row disposed between the outer rows, and the outer rows include non-active transducer elements at end regions of outer rows.

7. The system of claim 6, further comprising:
    electrical connections only to each of the active transducer elements.

8. The system of claim 1, wherein the two-dimensional array includes an even number of rows.

9. The system of claim 1, wherein the two-dimensional array includes an odd number of rows.

10. A method, comprising:
    receiving a signal indicating an imaging mode of interest, wherein the imaging mode indicates one of a first mode, which has a first focus depth, or a second mode, which has a second focus depth, wherein the second focus depth is greater than the first focus depth; and
    selectively exciting, with electronic circuitry, a set of rows of transducer elements of a non-rectangular two-dimensional array of active transducer elements based on the signal, wherein the non-rectangular two-dimensional array includes outer rows with end regions and at least one inner row disposed between the outer rows, the outer rows includes partial transducer elements in the end regions, the transducer elements of each row extend along a long axis, the rows are parallel to each other, and the partial transducer elements have a linear side that is diagonal to the long axis.

11. The method of claim 10, wherein the signal indicates the first mode, and further comprising:
    selectively exciting elements in a sub-set of rows of the two-dimensional array, wherein the sub-set includes the inner row and excludes the outer rows.

12. The method of claim 10, wherein the signal indicates the second mode, and further comprising: selectively exciting elements in all of the rows of the two-dimensional array.

13. The method of claim 10, further comprising:
    dissipating heat generated by the excited transducer elements through a thermally conductive material disposed at ends of the outer rows of the two-dimensional array.

14. The method of claim 10, wherein the nonrectangular two-dimensional array of active transducer elements is a sub-set of a non-rectangular two-dimensional array of transducer elements.

15. An imaging apparatus, comprising:
    a transducer array including a two-dimensional array of rows of transducer elements, wherein the two-dimensional array includes a thermal dissipater in a subregion of outer rows of the two-dimensional array of rows, wherein the two-dimensional array includes outer rows with end regions and at least one inner row disposed between the outer rows, the outer rows includes partial transducer elements in the end regions, the transducer elements of each row extend along a long axis, the rows are parallel to each other, the partial transducer elements have a linear side that is diagonal to the long axis, and the transducer array includes a non-rectangular set of active transducer elements;
    transmit circuitry that actuates the transducer elements to transmit an ultrasound signal;
    receive circuitry that receives echoes produced in response to an interaction with the ultrasound signal; and a beamformer that processes the echoes and generates one or more scan lines indicative of the structure.

* * * * *